United States Patent Office 3,472,685
Patented Oct. 14, 1969

3,472,685
METHODS OF DEPOSITING A VOLATILE MATERIAL ON A SOLID SUPPORT
Yves Marfaing and Francis Bailly, Massy, and Gérard Cohen-Solal, Paris, and Michel Rodot, Meudon, France, assignors to Centre National de la Recherche Scientifique, Paris, France
Filed May 20, 1966, Ser. No. 551,580
Claims priority, application France, May 25, 1965, 18,361
Int. Cl. B44d 1/092; C23c 13/02
U.S. Cl. 117—201          7 Claims

ABSTRACT OF THE DISCLOSURE

This invention is concerned with the deposition of a volatile material, such as mercury telluride or germanium telluride, on a support, such as cadmium telluride, lead telluride or germanium telluride when this is not the volatile material. The essential feature of this invention is that the volatile material and the support are kept, for the whole of the duration of the treatment, at a homogeneous temperature, preferably close to and lower than the melting point of the volatile material, instead of employing a temperature gradient between the volatile material and the support, as has hitherto always been the case.

---

The present invention relates to methods of depositing a volatile material on a solid support by crystalline growth, the volatile material that is considered being capable of diffusing into the support on which the deposit is to be formed.

The invention is more especially concerned with methods of this kind wherein the growth takes place in an epitaxic manner that is to say in the orientation of the crystalline network of the support, which may be, in particular, a monocrystal having a given orientation or a polycrystal.

The chief object of the present invention is to provide a method of this kind which is better adapted to meet the requirements of practice, in particular concerning simplicity of application.

We make use of a container enclosing a volatile material to be deposited on a support, said volatile material and said support being located opposite each other in such manner that a short, substantially uniform distance is maintained between them, this distance being sufficiently small to make sure that the composition of the deposit obtained on the support is identical, at least approximately, to that of said volatile material. The invention consists in maintaining, during the whole of the operation, said volatile material and said support at the same temperature, which is uniform and preferably close to the melting temperature of the volatile material that is considered.

A preferred embodiment of our invention will be hereinafter described with reference to the appended drawings, given merely by way of example, and in which.

The object of this invention is to form a deposit of a volatile material M upon a solid support S.

Figure 1:
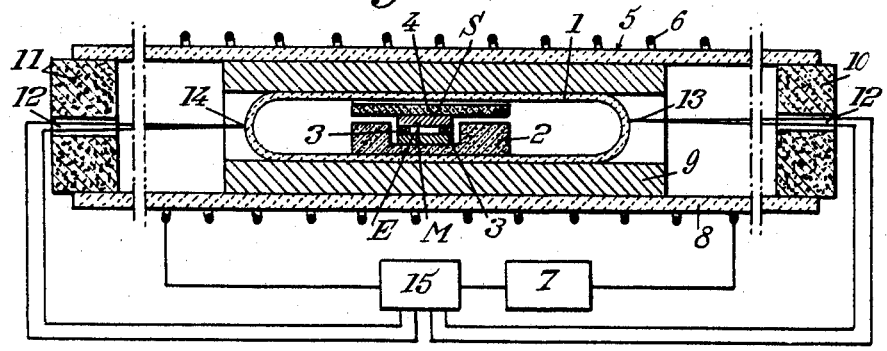
FIG. 1 is an axial sectional view of an oven used for performing the method according to the present invention.

As shown by FIG. 1, the volatile material M and the support S are placed in a container 1, the relative displacement of said volatile material M with respect to said support S being such that their respective faces located opposite each other and which are advantageously flat, are at a distance E from each other of a value such that the composition of the deposit obtained upon support S is at least approximately identical to that of the volatile material M.

According to the present invention, the volatile material M and the support S are kept, during the whole duration D of the operation, at the same temperature T, uniform over the whole area of the parts, and preferably close to the melting point of the volatile material M.

The temperature T at which volatile material M and support S are kept is, preferably, close to, and lower than, the melting temperature of the volatile material M, so that the latter remains in the solid state.

For this purpose, as shown by FIG. 1, the volatile material M, which is advantageously in the form of a flat plate, is placed in a retort 2, for instance of graphite, support S, which is also preferably in the form of a flat plate, being then held at a distance E from the volatile material M by means of distance pieces 3 which may advantageously be made of silica.

Retort 2, which is closed by a lid 4, also of graphite, is then placed in the middle portion of container 1, which is in the form of a tube closed at both ends in a fluid-tight manner.

This tube is made of a refractory material, such for instance as silica. Advantageously, after retort 2, fitted with its lid 4, has been placed in container 1, a vacuum is produced by pumping air from said tube.

This pumping may be performed in any suitable manner (by means of a primary blade pump and of a secondary diffusion pump, for instance), the pressure in the tube reduced, after the pumping operation and when the tube is sealed, to a value ranging from some microns to some thousandths of a micron of mercury.

It should be pointed out that the value of this pressure depends, among other factors, upon the vapor pressure of the volatile material M, the vapor pressure of the material of support S, the volume delivery rates of the primary and secondary pumps, the temperature at which the pumping has been performed (which temperature is generally the ordinary temperature), etc.

Container 1 having thus been sealed, after the pressure inside it has been reduced to the chosen value, it is then introduced into an oven 5 the dimensions of which are such, for instance, that the whole of the tube forming container 1 is, when oven 5 is in operation, at temperature T.

Oven 5 is advantageously an electric oven and it comprises the following elements:

(a) A heating resistance 6 fed from a current source 7 and surrounding a tubular structure 8 made of a refractory material;

(b) A sleeve 9 disposed inside tubular structure 8 and made of a material having a high thermal conductivity, such for instance as copper, said sleeve 9 having an axial length such that it wholly contains the sealed tube which constitutes container 1; and (c) Two plugs 10 and 11 closing the ends of tubular structure 8, each of these plugs, made of a refractory material, being provided with a passage 12 for two electrical conductors.

In order to control the temperature of container 1, we provide:

A thermocouple 13 the sensitive element of which is rigid with one of the ends of container 1, the two wires of this thermocouple 13 extending from oven 5 through the passage 12 provided in plug 10, and A thermocouple 14 the sensitive element of which is fixed to the other end of container 1, the two wires of this thermocouple 14 extending from oven 5 through the passage 12 provided in plug 11.

Both of said thermocouples 13 and 14 cooperate with a device 15 for controlling the temperature T of container 1.

It will now be supposed that volatile material M consists of mercury telluride forming, by epitaxic growth, a deposit upon a solid support S made of cadmium telluride.

The mercury telluride and cadmium telluride elements, which may be monocrystalline or not, are in the form of flat plates. These two plates have been subjected, at least on their faces located opposite each other, to a mechanical treatment (polishing) and a chemical treatment (attack).

It will be understood that, in the method of obtaining a deposit of a thickness A upon the cadmium telluride support, three main parameters are to be taken into consideration, to wit:

The temperature T at which container 1 is maintained;

The time D for which this temperature T is maintained (duration of the operation); and The value of the distance E between the faces of the mercury telluride piece and the cadmium telluride piece located opposite each other.

The deposit thickness A depends upon these three parameters T, D and E.

Figure 2:
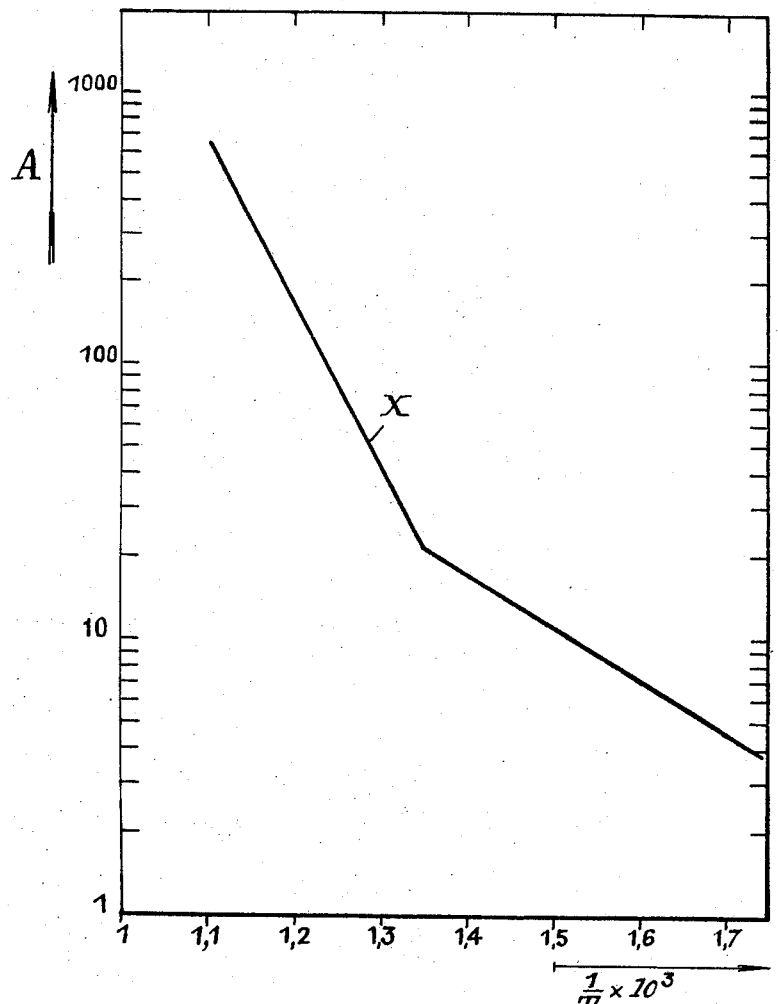
FIGS. 2 to 3 and 4 are curves illustrating the results obtained with the method according to the present invention.

FIG. 2 shows a curve wherein we have plotted, in abscissas and with a linear scale, the inverse of the temperature T expressed in Kelvin degrees, and in ordinates and with a logarithmic scale, the thickness A of the deposit, in microns.

The line X shown by FIG. 1 corresponds to experiments conducted for twenty four hours, the distance E between the mercury telluride piece and the cadmium telluride piece being 105 microns.

It will be seen that the thickness A of the deposit is an increasing function of the temperature T.

Figure 3:
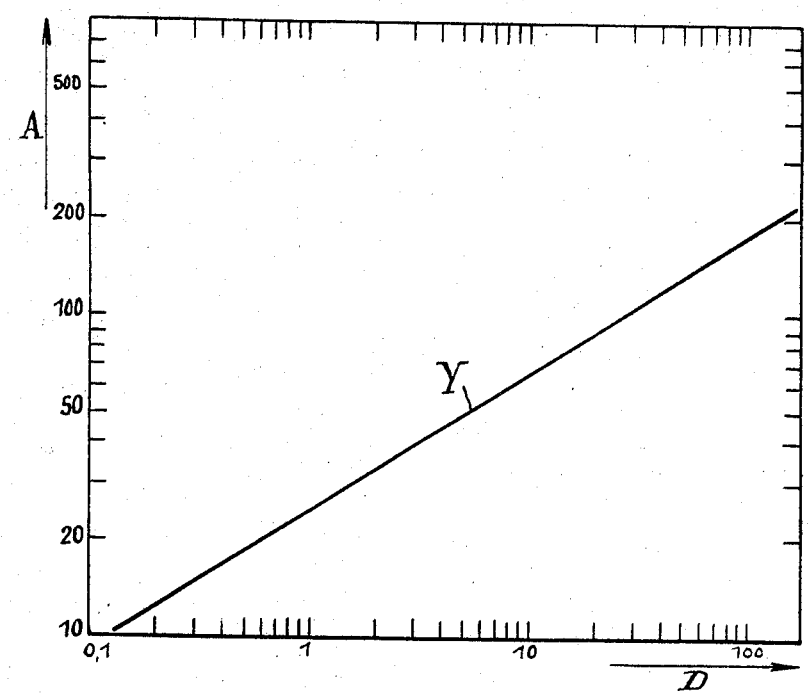

In FIG. 3 we have plotted, in abscissas and with a logarithmic scale, the time D, expressed in hours, for which the method is applied, and in ordinates and with a logarithmic scale, the thickness A of the deposit, in microns.

The line Y of FIG. 3 corresponds to experiments performed at a temperature T of 823 Kelvin degrees, the distance E between the mercury telluride piece and the cadmium telluride piece being 508 microns.

It will be seen that the thickness A of the deposit is an increasing function of the duration D of the method.

Figure 4:
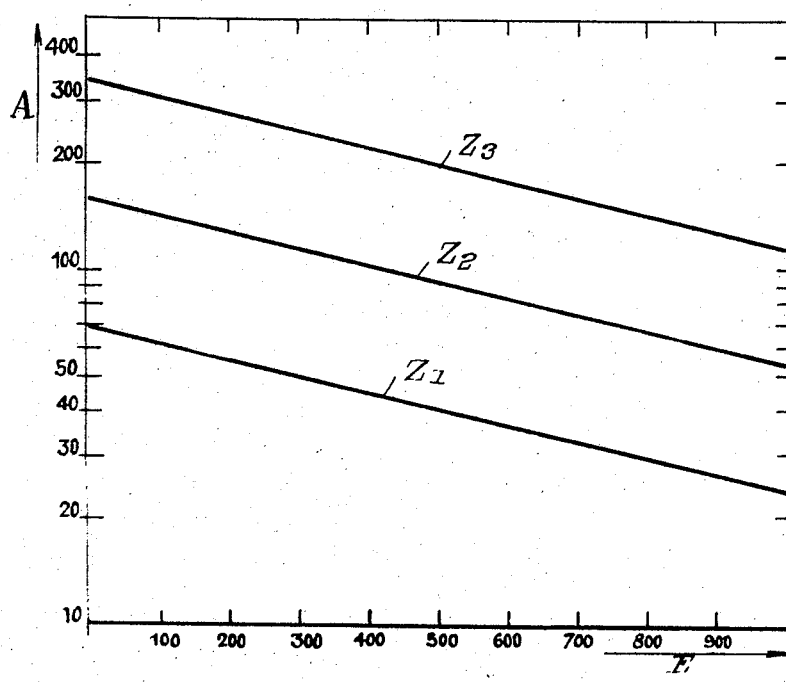

Finally, in FIG. 4, we have plotted, in abscissas and with a linear scale, the distance E between the mercury telluride piece and the cadmium telluride piece, expressed in microns, and in ordinates and with a logarithmic scale the thickness A of the deposit, in microns.

The lines $Z_1$, $Z_2$ and $Z_3$ of FIG. 4 correspond respectively to temperatures T of 733, 833 and 853 Kelvin degrees, the duration of the experiments being twenty-four hours in all cases.

It is found that the thickness A of the deposit is a decreasing function of distance D.

Up to now, we have referred to the depositing of a volatile material M consisting of mercury telluride upon a solid support S made of cadmium telluride by epitaxic growth of the mercury telluride deposit upon the cadmium telluride of piece S.

Of course, if it is desired to obtain deposits of other volatile materials upon other supports, the growth of said deposits being not epitaxic, the method remains identical to that above described.

We will now indicate by way of examples the results of some experiments concerning deposits the growth of which is not necessarily epitaxic:

(I) Depositing of mercury telluride upon lead telluride: with a temperature T of 823 Kelvin degrees, a distance E of 98 microns and a duration of the experiment of twenty four hours, we obtain a deposit 50 microns thick.

(II) Depositing of mercury telluride upon germanium telluride: with a temperature T of 823 Kelvin degrees, a distance E of 508 microns, and a duration of the experiment of twenty four hours, we obtain a deposit 40 microns thick.

(III) Depositing of germanium telluride upon cadmium telluride: with a temperature T of 823 Kelvin degrees, a distance E of 508 microns and a duration of the experiment of twenty four hours, we obtain a deposit 2 microns thick.

(IV) Depositing of germanium telluride upon lead telluride: with a temperature T of 823 Kelvin degrees, a distance E of 200 microns and a duration of the experiment of 100 hours, we obtain a deposit 35 microns thick.

It should be well understood that the method according to our invention may be applied, in particular, for the obtainment of nonhomogeneous semiconductor structures, such for instance as devices having a variable forbidden wavelength heterojunctions and the like.

What we claim is:

1. A method of producing deposits of volatile material by crystalline growth upon a solid support into which the volatile material is capable of diffusing which comprises locating the volatile material to be deposited and the support in a container opposite and at a short substantially uniform distance from each other, drawing a vacuum in said container and maintaining both said volatile material and said support at the same uniform temperature during the whole of the volatilization-deposition operation, said temperature being sufficient to produce volatilization of said volatile material and said distance between said volatile material and said support being a value such that the composition of the deposit coating obtained on the support is at least approximately identical to that of the volatile material, the thickness of the deposit coating on said support increasing with time.

2. A method according to claim 1 further characterized in that the temperature is lower than the melting point of volatile material, which therefore remains in the solid state.

3. A method according to claim 1 further characterized in that the volatile material is mercury telluride and the support is cadmium telluride.

4. A method according to claim 1 further characterized in that the volatile material is mercury telluride and the support is lead telluride.

5. A method according to claim 1 further characterized in that the volatile material is mercury telluride and the support is germanium telluride.

6. A method according to claim 1 further characterized in that the volatile material is germanium telluride and the support is cadmium telluride.

7. A method according to claim 1 further characterized in that the volatile material is germanium telluride and the support is lead telluride.

References Cited

UNITED STATES PATENTS

| | | | |
|---|---|---|---|
| 2,918,437 | 12/1959 | Broser et al. | 252—501 |
| 3,044,902 | 7/1962 | Thornton | 117—215 |
| 3,063,871 | 11/1962 | Barkemeyer et al. | |
| 3,142,596 | 7/1964 | Theuerer | 148—175 |
| 3,312,571 | 4/1967 | Ruehrwein | 23—204 X |

OTHER REFERENCES

Chemical Abstracts, vol. 54 (1960), 8303g relied upon.

ANDREW G. GOLIAN, Primary Examiner

U.S. Cl. X.R.

117—106